United States Patent
Bulgajewski et al.

(10) Patent No.: US 10,953,814 B2
(45) Date of Patent: Mar. 23, 2021

(54) HYBRID HEATER FOR VEHICLE SENSOR SYSTEM

(71) Applicant: ILLINOIS TOOL WORKS INC., Glenview, IL (US)

(72) Inventors: Edward F. Bulgajewski, Genoa, IL (US); Piotr Sliwa, Mt. Prospect, IL (US); John F. Healey, Naperville, IL (US)

(73) Assignee: Illinois Tool Works Inc., Glenview, IL (US)

(*) Notice: Subject to any disclaimer, the term of this patent is extended or adjusted under 35 U.S.C. 154(b) by 119 days.

(21) Appl. No.: 16/073,268

(22) PCT Filed: Feb. 21, 2017

(86) PCT No.: PCT/US2017/018669
§ 371 (c)(1),
(2) Date: Jul. 26, 2018

(87) PCT Pub. No.: WO2017/151348
PCT Pub. Date: Sep. 8, 2017

(65) Prior Publication Data
US 2019/0031116 A1 Jan. 31, 2019

Related U.S. Application Data

(60) Provisional application No. 62/312,607, filed on Mar. 24, 2016, provisional application No. 62/301,014, filed on Feb. 29, 2016.

(51) Int. Cl.
*H05B 3/84* (2006.01)
*B60R 11/04* (2006.01)
(Continued)

(52) U.S. Cl.
CPC .............. *B60R 11/04* (2013.01); *G03B 17/55* (2013.01); *H05B 3/34* (2013.01); *H05B 3/84* (2013.01);
(Continued)

(58) Field of Classification Search
CPC ...... H05B 3/34; H05B 3/84; H05B 2203/003; H05B 2203/007; H05B 2203/013;
(Continued)

(56) References Cited

U.S. PATENT DOCUMENTS

2006/0028730 A1* 2/2006 V. Varaprasad ......... B32B 17/06
359/604
2006/0086710 A1* 4/2006 Meiler ................... H05B 3/146
219/202

(Continued)

FOREIGN PATENT DOCUMENTS

| JP | 2008517422 A | 5/2008 |
|---|---|---|
| JP | 2013513538 A | 4/2013 |

OTHER PUBLICATIONS

Office Action from corresponding Japanese Patent Application No. 2018-545324, dated Nov. 17, 2020 (8 pages).

*Primary Examiner* — Brian W Jennison
(74) *Attorney, Agent, or Firm* — Quarles & Brady LLP

(57) ABSTRACT

A window heater for a vehicular camera or the like provides for a first heating element surrounding the field-of-view of the camera and a second heater element winding through the field-of-view of the camera to optimize heat delivery to the windshield without obstructing the camera's field-of-view.

20 Claims, 2 Drawing Sheets

(51) Int. Cl.
  *G03B 17/55* (2021.01)
  *H05B 3/34* (2006.01)
  *B60R 11/00* (2006.01)
(52) U.S. Cl.
  CPC . *B60R 2011/0026* (2013.01); *H05B 2203/003* (2013.01); *H05B 2203/007* (2013.01); *H05B 2203/013* (2013.01); *H05B 2203/02* (2013.01); *H05B 2203/037* (2013.01); *H05B 2214/02* (2013.01)
(58) Field of Classification Search
  CPC .......... H05B 2203/02; H05B 2203/037; H05B 2214/02; B60R 11/04
  See application file for complete search history.

(56) References Cited

U.S. PATENT DOCUMENTS

| | | | |
|---|---|---|---|
| 2010/0032421 A1* | 2/2010 | Martinez | H05B 3/84 219/203 |
| 2010/0219173 A1* | 9/2010 | Gruber | H05B 3/86 219/203 |
| 2012/0103960 A1 | 5/2012 | Bressand et al. | |
| 2013/0277352 A1 | 10/2013 | Degen et al. | |

* cited by examiner

HYBRID HEATER FOR VEHICLE SENSOR SYSTEM

CROSS REFERENCE TO RELATED APPLICATIONS

This application claims the benefit of U.S. provisional application 62/301,014 filed Feb. 29, 2016, and U.S. provisional application 62/312,607 filed Mar. 24, 2016, both hereby incorporated by reference.

FIELD OF THE INVENTION

The present invention relates generally to vehicular systems and, in particular, to advanced vehicular sensor systems such as lane departure sensors.

BACKGROUND OF THE INVENTION

Vehicular systems for determining whether a vehicle is being held within a road lane and, if not, providing a warning to the driver (lane departure warning) are being developed as part of current vehicle safety equipment.

Sensors for use with lane departure warning (LDW) systems may include cameras mounted within the vehicle compartment, typically between the center rearview mirror and the windshield. From this location, the camera is positioned so that its field-of-view is directed toward the road in front of the vehicle. The space between the camera and the windshield may be protected by a glare shield to prevent light from outside of the field-of-view of the camera from interfering with the camera sensing.

The image signals obtained from the camera for the LDW are critical to determining the location of the lane lines and thus the relative location of the vehicle. These image signals may be degraded by frost, ice, or fog on the windshield.

SUMMARY OF THE INVENTION

The present invention provides a heater positionable on the windshield between the windshield and the camera. The heater provides a first power-controlled, positive temperature coefficient (PTC) heater ring around the field-of-view and a standard linear resistance heater passing through the field-of-view. Together these heaters provide for rapid defrosting with heat from the outer heater migrating inwardly into the field-of-view and heat from the lower wattage heater directly heating the field-of-view.

Both heaters may be applied first to a substrate that may be then attached adhesively to the windshield, greatly reducing the cost of rework over systems that provide conductive traces directly to the windshield glass.

Specifically, in one embodiment, the invention provides a vehicular sensor heater formed on a flexible substrate having a periphery and a central area surrounded by the periphery, the periphery sized to circumscribe a field-of-view of a vehicular imaging sensor through a window when the flexible substrate is attached to the window. A first and second terminal may be supported on the flexible substrate and a first resistive coating applied to the periphery of the flexible substrate. A first electrode material is applied to the first resistive coating to provide an electrical path between the first and second terminals through the resistive coating. A second resistive coating different from the first resistive coating is applied to the central area of the flexible substrate to provide an electrical path between the first and second terminals through the second resistive coating.

It is thus a feature of at least one embodiment of the invention to employ different heater technologies in order to provide both high heat output and effective optical transparency.

The first resistive coating may be a positive temperature coefficient resistant material.

It is thus a feature of at least one embodiment of the invention to maximize heat output of the out-of-field outer heater element to use of temperature control.

The first resistive material may be applied on a ring around the field-of-view and the first electrode material provides a first conductor communicating between the first terminal and a radially outer edge of the first resistive material and a second conductor communicating between the second terminal and the radially inner edge of the first resistive material.

It is thus a feature of at least one embodiment of the invention to provide a radial electrical flow such as promotes more uniform heating.

The first and second conductors may provide radially-extending interdigitated conductive fingers.

It is thus a feature of at least one embodiment of the invention to provide a relatively narrow high wattage heater with reduced risk of hotspots.

The second resistive coating may be a linear temperature coefficient resistance material.

It is thus a feature of at least one embodiment of the invention to employ a technology allowing for thinner heater conductors for the portion of the heater within the optical field-of-view.

The second resistive coating may follow a serpentine path through the field-of-view.

It is thus a feature of at least one embodiment of the invention to increase the total electrical resistance of the second resistive coating to permit parallel operation with the peripheral heater.

The substrate may be transparent.

It is thus a feature of at least one embodiment of the invention to maximize light transmission through the heater while allowing heat to be applied directly on the window in the field-of-view.

The substrate may include cutouts in the central area of the substrate flanking the electrical path of the second resistive coating. The cutouts may occupy greater than 25 percent of the area of the central area.

It is thus a feature of at least one embodiment of the invention to reduce optical aberration by minimizing light paths through the substrate, even if clear.

The second resistive coating may provide a conductor having a thickness in the plane of the substrate less than 0.05 inches.

It is thus a feature of at least one embodiment of the invention to minimize optical interference from the opaque second resistive coating.

The vehicular sensor heater may further include a light-absorbing coating applied over the second resistive coating having lower light reflection than the second resistive coating.

It is thus a feature of at least one embodiment of the invention to minimize internal reflections caused by reflective material such as silver conductive paint.

The first electrode material and second resistive coating may be the same material.

It is thus a feature of at least one embodiment of the invention to simplify manufacturing by using the electrode material also as a heater material.

The second resistive coating may have a lower sheet resistance than the first resistive coating.

It is thus a feature of at least one embodiment of the invention to minimize the thickness of the heater element in the optical window by employing a low resistance material that can be made thin within the field-of-view.

The first and second resistive coatings and first electrode material may be inks applicable in a printing process.

It is thus a feature of at least one embodiment of the invention to permit the manufacture of a complex heater technology using printing processes.

The first resistive coating may provide a greater wattage output than the second resistive coating.

It is thus a feature of at least one embodiment of the invention to concentrate greater heating power around the periphery of the field-of-view so as to permit an optically unobtrusive heater within the field-of-view.

The vehicular sensor heater may include an adhesive on at least one of a first and second opposed face of the substrate.

It is thus a feature of at least one embodiment of the invention to permit the vehicular sensor heater to be employed to attach the camera system to the window of the vehicle.

The vehicular sensor heater may further include a release liner over the adhesive on the first and second face.

It is thus a feature of at least one embodiment of the invention to provide a stabilization of the die cut areas and/or to simplify handling of the sheet heater during manufacture.

The terminals may be attached to the substrate with metal rivets passing through the substrate.

It is thus a feature of at least one embodiment of the invention to provide a simple interface between a flexible sheet heater, that can be installed on a window, and the Vehicle electrical system.

Other features and advantages of the invention will become apparent to those skilled in the art upon review of the following detailed description dahlias and drawings in which like numerals are used to designate like features.

Figure 1:
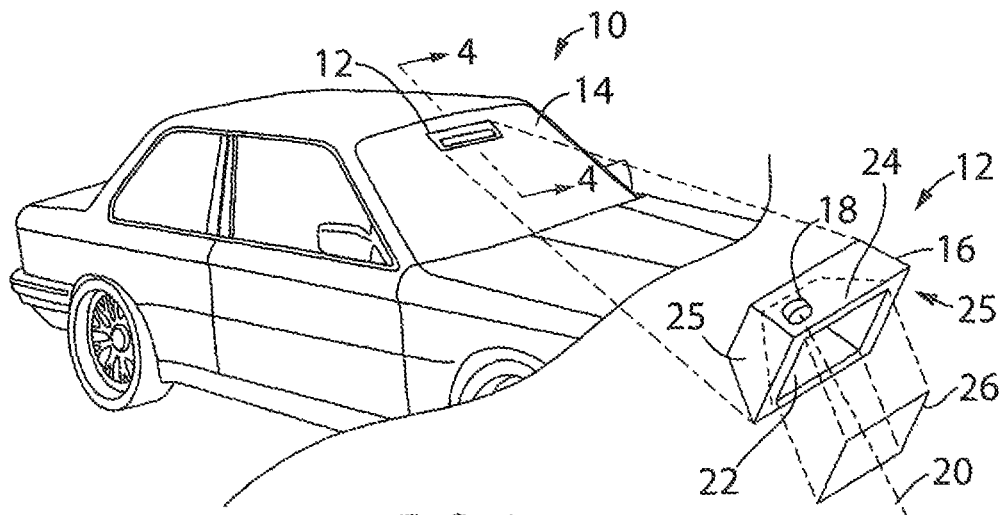
FIG. 1 is a perspective view of an automobile windshield from outside of the automobile showing a typical placement of an LDW sensor and showing a detailed view of the camera and glare shield for the sensor.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a vehicle 10 may provide for a lane departure warning (LDW) sensor system 12 positioned at a top center location on a windshield 14 of the vehicle 10. Generally the LDW sensor system 12 may provide for a glare shield 16 positioned around a lens of a camera 18, the latter of which may be directed along a view axis 20 toward a road in front of the vehicle 10 to monitor the position of lane lines on the road (not shown). The glare shield 16 may extend between the lens of the camera 18 and the windshield 14 to block off-axis light and may be constructed, for example, of an injection molded thermoplastic material of a dark color with a surface coated or textured to reduce reflection.

The glare shield 16 may include a lower triangular glare panel 22 extending from the windshield 14 to a lower edge of the camera 18 and an upper glare pane 24 extending from an upper edge of the camera 18 to the windshield 14. The upper glare panel 24 and lower glare panel 22 angle away from each other as one moves from the camera 18 to the windshield 14 so as to follow but not obstruct a field-of-view 26 of the camera about axis 20 through the windshield 14, the field-of-view 26 being necessary for the camera to properly view the road. Side glare panels 25 join left and right corresponding edges of the upper glare panel 24 and lower glare panel 22 to block light off of the view axis 20 from the left or right sides.

Figure 2:
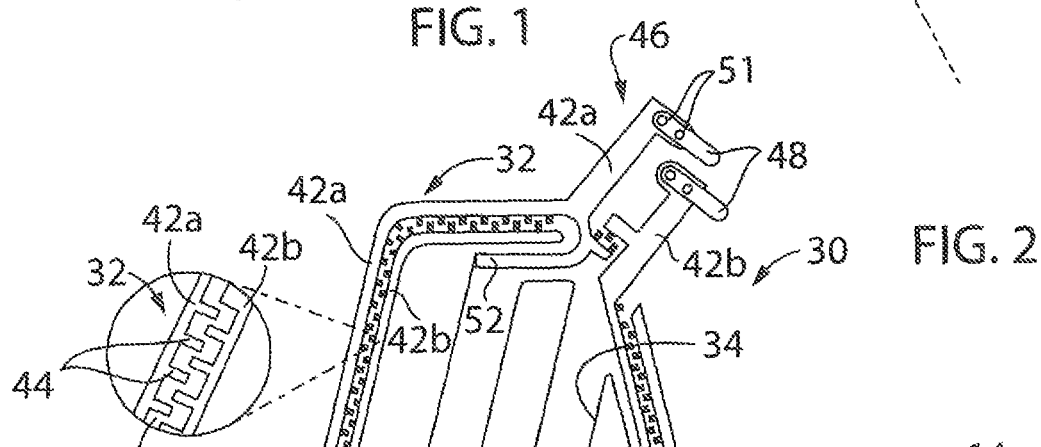
FIG. 2 is a rear elevational view of a hybrid heater assembly for heating the windshield of FIG. 1.

Referring now to FIG. 2, the present invention provides a flexible heater sheet 30 comprising, for example, a continuous and transparent polyester film substrate, for example, from 0.004-0.007 inches in thickness. For example, the heater sheet 30 may be a trapezoid having a base of about four inches and height of about four inches and has a periphery larger than the field-of-view 26. A tab 36 of the heater sheet 30 may extend outside of this trapezoid and outside of the field-of-view 26 to provide for a connection point for electrical connection to conductors of the heater sheet 30 as will be discussed below.

The flexible heater sheet 30 may be positioned on the windshield aligned with the view axis 20 to substantially cover and surround the field-of-view 26 to heat the windshield 14 in this area. Ideally, the flexible heater sheet 30 may be of optical quality providing for low optical distortion or aberration (provided by optically flat surfaces) and low absorption to be optically clear. For this purpose, materials other than polyester may be used such as acetates.

A resistive material is applied in a band along the outer periphery of the flexible heater sheet 30 to provide an outer positive temperature coefficient (PTC) heater band 32 generally having a trapezoidal shape whose inner periphery conforms to the field-of-view 26 (shown in FIG. 1). More specifically, the heater band 32 may provide for a partial ring of temperature-regulating resistance material 40 applied directly to the flexible heater sheet 30, for example, by screen-printing a conductive paint or applied over electrodes 42 as will be discussed below. The temperature-regulating resistance material 40 has the property of conducting electricity with a positive temperature coefficient of resistance. A positive temperature coefficient of resistance causes the amount of electrical flow to vary according to the temperature of the material, with increased electrical flow at lower temperatures and decreased electrical flow at higher temperatures typically following a substantially nonlinear pattern as a function of temperature. This property provides for a self-regulating temperature of the temperature-regulating resistance material 40 when a substantially constant voltage source is applied across the temperature-regulating resistance material 40.

The top surface of the temperature-regulating resistance material 40 on the heater sheet 30 may support conductive buses 42a and 42b (or these may be pre-applied beneath the resistance material 40 directly to the flexible heater sheet 30). These conductive buses 42a and 42b have substantially lower resistance than the temperature-regulating resistance material 40 and applied in parallel but opposed bands at inner and outer edges of the ring of temperature-regulating resistance material 40 to electrically contact the temperature-regulating resistance material 40. The conductive buses 42a and 42b, for example, may be screen-printed silver paint. Electrode fingers 44 extend inward in interdigitated fashion from each bus 42a and 42b over the temperature-regulating resistance material 40 without touching each other so as to provide a gap for electrical flow between the fingers 44 through the temperature-regulating resistance material 40. The buses 42a and 42b and the associated fingers 44 of these electrodes may be screen-printed on the temperature-regulating resistance material 40 or applied as a decal or by other techniques.

The other end of the buses 42a and 42b that extend along the tab 46 of the flexible heater sheet 30 are attached to metal terminals 48 by means of rivets 51 providing mechanical contact with the flexible heater sheet 30 and electrical contact with the conductors of bus 42a and 42b to provide electrical connection to an automotive power system, for example, twelve volts. In this way, voltage applied across the terminals 48 is conducted through the buses 42a and 42b to provide current flow across the interdigitated fingers 44 through the temperature-regulating resistance material 40 and along the plane of the heater sheet 30 to provide an outer heater band 32.

Fitting within the heater band 32 and also applied to the flexible heater sheet 30 is a serpentine trace 34 of a linear resistance material which weaves in a raster pattern through the field-of-view 26 to distribute the conductor of the trace 34 approximately evenly over the area of the field-of-view 26. The linear resistance material of the trace 34 will generally have low temperature dependency and in any case a low linear temperature dependency much less than provided by the temperature-regulating resistance material 40. The trace 34 may, for example, be a screen-printed silver paint having substantially fixed resistance as a function of temperature and a maximum width that is limited so as not to interfere with the camera image, for example, of 0.025 inches. More specifically, the width of the trace 34 in the plane of the field-of-view 26 preferably will be limited to a thickness of less than 0.05 inches.

Bus 42a may run about the outside of bus 42b except for a portion 52 that may pass inside of bus 42b around one end of bus 42b furthest removed from a terminal 48. This portion 52 is exposed within the heater band 32 to attach to a first end of the trace 34, the latter of which, after winding through the field-of-view 26, may terminate in a connection at bus 42b having a portion also exposed to the field-of-view 26. In this way, voltage applied to the terminals 48 may simultaneously be directed through the temperature-regulating resistance material 40 of the heater band 32 and through the trace 34. In other words, the resistance formed by the outer heater band 32 may be in parallel with the resistance formed by the trace 34 so that current flows through both of these elements in parallel at a ratio determined by the relative ratios of the resistances of each of these elements. The current draw of the entire system may be between 0.5 and 2.5 amperes When operating at 10 to 16 volts.

Generally the linear resistance material of the serpentine trace 34 will have a sheet resistance lower than the sheet resistance of the temperature-regulating resistance material 40. Sheet resistance, also known as bulk resistance, has units of ohms often termed ohms per square which is dimensionally equal to ohms but used exclusively for sheet resistance. Ohms per square describes a resistance of a square sheet of the material. In addition, the wattage output of the serpentine trace 34 may be less than the wattage output of the heater band 32.

Positive temperature coefficient (PTC) materials, suitable for the present invention, are also disclosed in U.S. Pat. Nos. 4,857,711 and 4,931,627 to Leslie M. Watts hereby incorporated in then entirety by reference. The resistance may vary, for example, between five ohms at −20 degrees centigrade and 6.5 ohms at positive 20 degrees centigrade.

Figure 3:
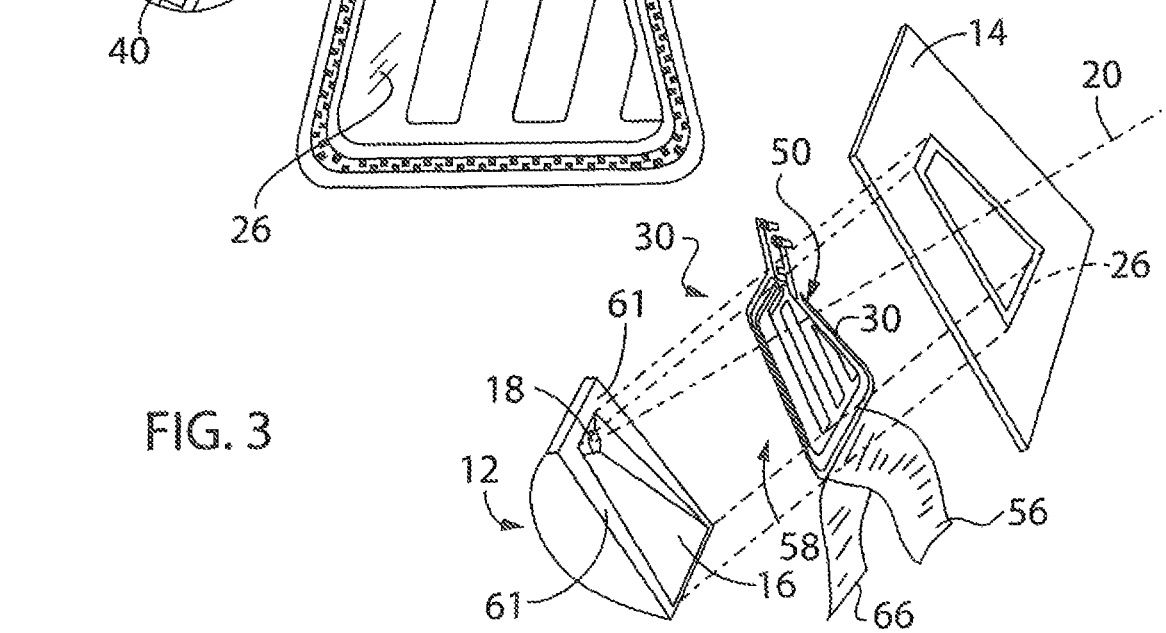
FIG. 3 is an exploded perspective view the hybrid heater attachable to the windshield using an adhesive-coated flexible substrate.

Referring now to FIG. 3, the heater sheet 30 may be attached by means of a pressure sensitive adhesive layer 50 on one face of the heater sheet 30 generally over the trace 34 and the heater band 32. During final fabrication, a release liner 56 previously attached over the adhesive layer 50 to protected it may be pulled from the pressure sensitive adhesive layer 50, and the assembly of the heater sheet 30, buses 42 and trace 34, and temperature-regulating resistance material 40 may be applied directly to the windshield 14. Windshield contacting portion 61 of the glare shield 16 may then be attached directly to the windshield 14 or in one embodiment attached over the heater band 32 with a second adhesive layer 58 applied to the exposed side of the heater sheet 30 away from the windshield 14 only over the heater band 32. Treatment of the windshield 14 to remove lint and dirt, for example, by electrostatic dust reduction techniques or a cohesive roller, may precede application of the heater sheet 30 which may be applied with a squeegee or the like to eliminate included air bubbles.

Figure 4:
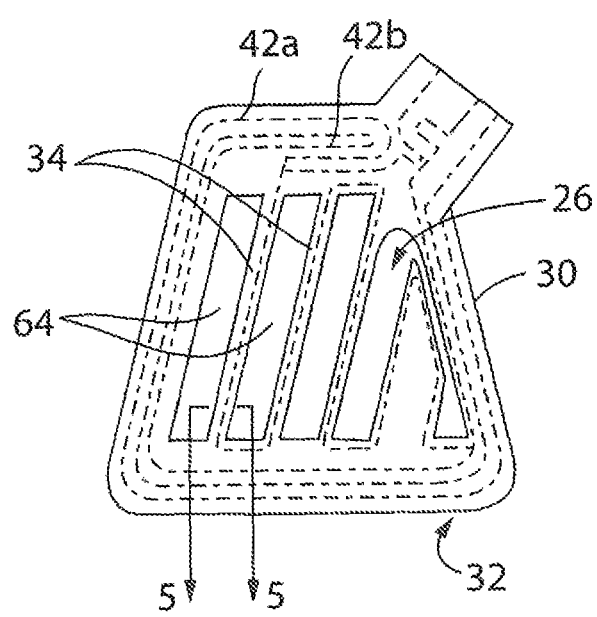
FIG. 4 is a view similar to FIG. 2 showing a clear substrate material and cutouts in the substrate material with paths of electrical conduction shown with dotted lines.
Figure 5:
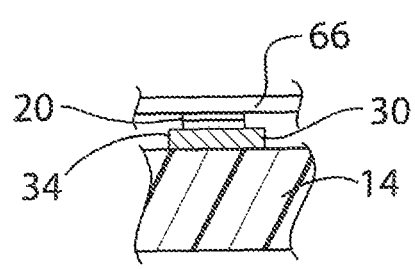
FIG. 5 is a cross-section along line 5-5 of FIG. 4 showing an over coating of the conductors for reduced reflection and a stabilizing adhesively-attached sheet.

Referring now to FIGS. 4 and 5, the flexible heater sheet 30 may include die cut openings 64 removing material within the field-of-view 26 of the camera 18 within the heater band 32 but outside the region of the conductive traces 34 to provide the minimum necessary support for the conductive traces 34 by the heater sheet 30. In this way, distortion or aberration caused by the flexible heater sheet 30 in the field-of-view 26 (even when it is optically clear) may be minimized. This approach may also be used for opaque flexible heater sheet 30. In one embodiment, the width of the strips of the flexible heater sheet 30 supporting the conductive traces 34 may be as narrow as equal to the width of the conductive traces 34 and stabilized, for example, prior to installation (shown in FIG. 3) by a removable stabilizer sheet 66 that may be peeled away after installation of the heater sheet 30 on the windshield 14. The stabilizer sheet 66 may be applied after the die cut areas are removed. Generally the area of the die cut openings 64 within the field-of-view 26 of the camera 18 may be greater than 25 percent and preferably greater than 50 percent of that area.

The conductive traces 34 may be coated with the same PTC material of the heater band 32 or a light-absorbing paint or coating 70 on one or both sides so as to reduce its glare and provide for a darker glare-resistant surface facing the camera 18 and outward through the windshield 14. Alternatively and/or in addition, a die or pigment may be introduced into the material of the conductive traces 34 to darken the conductive traces, or the conductive metal may be treated on the outer surface of the conductive trace 34 to darken it, or the conductive metal of the conductive traces may be replaced all or in part with a darker material such as a highly conductive granulated carbon still having lower resistance than the PTC material of the heater band 32.

It will be appreciated that the sensor system 12 of any of the above embodiments may be not only optical sensors such as cameras but also radar antennas for radar systems or ultrasonic acoustic transducers for ultrasound systems, and in these latter cases the windshield 14 may be replaced with a specialized window material. Further it will be appreciated that the windshield 14 may be a dedicated window for the sensor system 12 separate from a main windshield of the vehicle.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claim.

What is claimed is:

1. A vehicular sensor heater comprising:
   a flexible substrate having a periphery and a central area surrounded by the periphery, the periphery sized to circumscribe a field-of-view of a vehicular imaging sensor through a window when the flexible substrate is attached to the window;
   a first and second terminal supported on the flexible substrate;
   a first resistive coating supported at the periphery of the flexible substrate;
   a first electrode material extending around the periphery of the flexible substrate and communicating with the first resistive coating to provide an electrical path between the first and second terminals through the resistive coating; and
   a second resistive coating different from the first resistive coating supported by the central area of the flexible substrate to provide an electrical path between the first and second terminals through the second resistive coating.

2. The vehicular sensor heater of claim 1 wherein the first resistive coating is a positive temperature coefficient resistant material.

3. The vehicular sensor heater of claim 2 wherein the first resistive material is formed in a ring around the field-of-view and the first electrode material provides a first conductor communicating between the first terminal and a radially outer edge of the first resistive material and a second conductor communicating between the second terminal and the radially inner edge of the first resistive material.

4. The vehicular sensor heater of claim 3 wherein the first and second conductors provide radially-extending interdigitated conductive fingers.

5. The vehicular sensor heater of claim 2 wherein the second resistive coating is a linear temperature coefficient resistance material.

6. The vehicular sensor heater of claim 5 wherein the second resistive coating follows a serpentine path through the field-of-view.

7. The vehicular sensor of claim 5 wherein the substrate is transparent.

8. The vehicular sensor heater of claim 7 further including cutouts in the central area of the substrate flanking the electrical path of the second resistive coating.

9. The vehicular sensor heater of claim 8 wherein the cutouts occupy greater than 25 percent of the area of the central area.

10. The vehicular sensor heater of claim 1 wherein the second resistive coating provides a conductor having a thickness in a plane of the substrate less than 0.05 inches.

11. The vehicular sensor heater of claim 5 further including a light-absorbing coating applied over the second resistive coating having lower light reflection than the second resistive coating.

12. The vehicular sensor heater of claim 5 wherein the first electrode material and second resistive coating are the same material and are attached directly to the flexible substrate.

13. The vehicular sensor heater of claim 5 wherein the second resistive coating has a lower sheet resistance than the first resistive coating.

14. The vehicular sensor heater of claim 1 wherein the first and second resistive coatings and first electrode material are inks applicable in a printing process.

15. The vehicular sensor heater of claim 1 wherein the first resistive coating provides a greater wattage output than the second resistive coating.

16. The vehicular sensor heater of claim 1 further including an adhesive on at least one of a first and second opposed faces of the substrate.

17. The vehicular sensor heater of claim 16 further including a release line over the adhesive on the first and second face.

18. The vehicular sensor heater of claim 1 wherein the terminals are attached to the substrate with metal rivets passing through the substrate.

19. The vehicular sensor heater of claim 1 further including a window attached to the substrate.

20. A vehicular sensor system comprising:
   a window;
   an imaging sensor positioned behind the window having a field-of-view directed outward from a vehicle;
   a flexible substrate attached to the window and having a periphery and a central area surrounded by the periphery, the periphery sized to circumscribe the field-of-view of the imaging sensor;
   a first and second terminal supported on the flexible substrate;
   a first resistive coating supported at the periphery of the flexible substrate;
   a first electrode material communicating with the first resistive coating to provide an electrical path between the first and second terminals through the resistive coating; and
   a second resistive coating communicating with the central area of the flexible substrate to provide an electrical path between the first and second terminals through the second resistive coating;
   whereby different heating technologies are provided within the field-of-view and around the field-of-view.

* * * * *